United States Patent [19]
Wyatt

[11] Patent Number: 5,422,945
[45] Date of Patent: Jun. 6, 1995

[54] FAST LAST DIGIT DETECTION OF A DIALED TELEPHONE NUMBER

[75] Inventor: Jerry Wyatt, Glendale, Ariz.

[73] Assignee: American Express TRS, New York, N.Y.

[21] Appl. No.: 92,756

[22] Filed: Jul. 16, 1993

[51] Int. Cl.⁶ .............................................. H04M 3/06
[52] U.S. Cl. .................................... 379/283; 379/286; 379/386
[58] Field of Search .................. 379/67, 92, 112, 353, 379/58, 59, 355, 63, 57, 286, 221, 273, 291, 210, 283, 282, 360, 361, 386; 381/43

[56] References Cited
U.S. PATENT DOCUMENTS 4,658,096 4/1987 West, Jr. et al. ........................ 379/59
4,922,517 5/1990 West, Jr. et al. ........................ 379/58
5,046,085 9/1991 Godsey et al. ........................ 379/112
5,091,877 2/1992 Itoh et al. ............................... 379/92

Primary Examiner—James L. Dwyer
Assistant Examiner—Scott Wolinsky
Attorney, Agent, or Firm—Snell & Wilmer

[57] ABSTRACT

A method and system for efficiently recognizing the last digit of a computer-dialed DTMF telephone number. The actual gaps between a number of first-dialed successive digits are compared with a standard gap exhibited during computer dialing to determine whether the dialing in progress is manual or automatic. As dialing proceeds, the absence of a digit for a preset time indicates that dialing has been completed. The preset time is set to a small value if it is determined that computer dialing is in progress.

13 Claims, 2 Drawing Sheets

FAST LAST DIGIT DETECTION OF A DIALED TELEPHONE NUMBER

TECHNICAL FIELD

The present invention relates to a system and method for efficiently interfacing local and remote units of a telecommunications system. More particularly, it relates to a means for quickly and accurately detecting the last digit dialed from a standard dual tone, multiple frequency (DTMF) telephone based on the timing pattern of dialed digits.

BACKGROUND ART

There are basically two prior art schemes which have been used to detect the last dialed digit of a dialed telephone number. These two prior art schemes are generically described as a fixed time delay and the North American Dialing Plan (NADP) scheme.

The most common and simplest scheme, the fixed time delay scheme, is implemented by receiving DTMF digits and simply waiting a preset amount of time after the last digit before extending the call to the called site. This set amount of time is typically five seconds, i.e., if a digit is not received within five seconds of the last dialed digit, then the system assumes that the last digit has been dialed. The drawback of such a scheme is evident; the delay period is longer in duration than even the time required to dial an eleven digit computer generated phone number.

The second prior art scheme takes advantage of the NADP. The first digit entered is examined, and if it is a "1", then ten digits are to follow. If the first digit is not a "0" or "1", then the next two digits are checked for "11", i.e., "411", "711" or "911." If this test also fails, then the system assumes a seven digit number will be dialed. As soon as seven digits are entered, this phase of dialing is determined to be complete. While the NADP scheme is certainly much faster than the fixed time delay scheme, it is not universally applicable, e.g., it will not work with some of the newer numbering arrangements such as "10288."

Accordingly, it is a primary object of the present invention to provide a new and improved system and method for efficiently recognizing the last digit of a standard dual tone, multiple frequency telephone number.

It is another object of the present invention to provide a new and improved system and method of efficiently recognizing the last digit of a telephone number dialed from a standard DTMF telephone which greatly reduces the time needed for the dialed number to be transmitted from a local unit to a remote unit.

SUMMARY OF THE INVENTION

Briefly stated, and in accordance with one embodiment of this invention, a method and system of efficiently recognizing the last digit of a telephone number dialed from a standard DTMF telephone is provided which analyzes a series of early dialed digits and makes a determination based on their spacing whether the digits are computer or manually generated. In the preferred embodiment described herein, the system (i) calculates an actual time gap between successive digits of the telephone number; (ii) compares the actual time gap to a known average time gap for computer generated digits; (iii) recognizes whether the telephone number is computer generated based upon the comparing step; (iv) sets a time delay for receiving successive digits equal to a minimal value when said telephone number is recognized as being computer generated; and (v) signals receipt of the completed telephone number when said time delay expires without recognition of a dialed digit. Although the inventive system can be incorporated using hardware components, a software implementation is preferred.

BRIEF DESCRIPTION OF THE DRAWINGS

While the specification concludes with claims particularly pointing out and distinctly claiming the subject matter regarded as the invention herein, it is believed that the present invention will be more readily understood from the following derailed description, taken in conjunction with the accompanying drawings, in which:

DETAILED DESCRIPTION OF THE DRAWINGS

Figure 1:
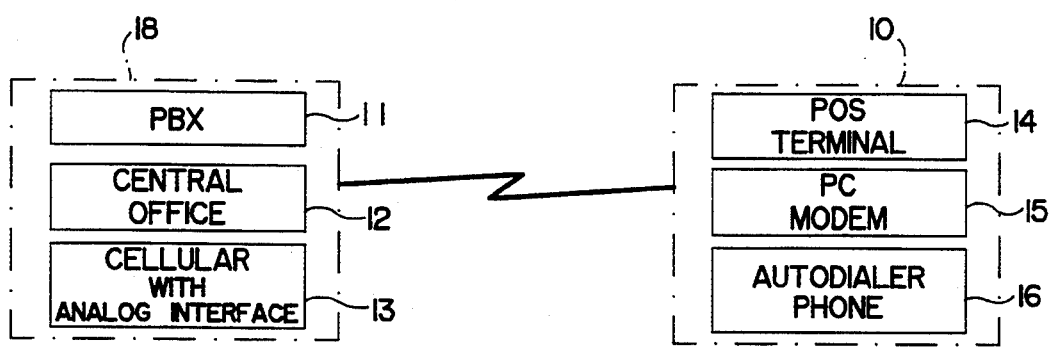
FIG. 1 is a block diagram illustrating environments in which the present invention finds use.

Referring to FIG. 1, several possible uses of the present invention are shown. Generally, the invention is used to communicate between one or more local units, as represented in box 10, and one or more remote units as illustrated in box 18. The local unit can be a point of sale (POS) terminal 14, a PC modem 15, or an autodial phone 16, and the remote unit can include one or more of a private branch exchange (PBX) 11, a central office location 12, or a cellular phone 13 with an analog interface. In a typical implementation, the system determines when a completed telephone number has been dialed in a local unit (numbered elements 14, 15 and 16) and should be transmitted to a remote location (numbered items 11, 12 and 13).

While the recognition of a last digit dialed in a telephone number can be noted at a remote location, it is a more typical practice to determine if a completed telephone number has been dialed before sending the telephone number along communication line 20.

Figure 2:
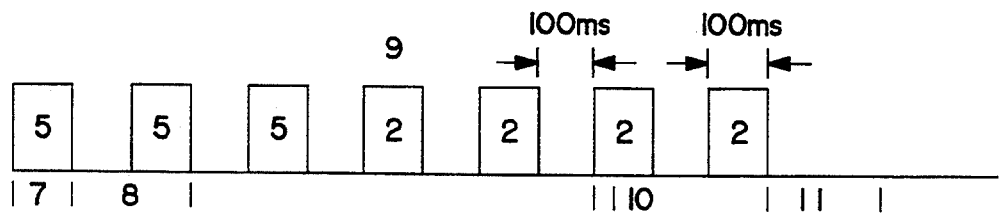
FIG. 2 depicts a stream of incoming computer generated dual tone, multiple frequency digits.

FIG. 2 illustrates a computer generated, seven digit telephone number "555-2222" being transmitted on a time base. For purposes of simplicity, each digit (boxes numbered 2 and 5) has a duration of 100 milliseconds and a spacing 11 between digits of 100 milliseconds. Thus, if measurement began from the leading edge of the first digit 12, the time necessary to generate this phone number 13 would be 1,300 milliseconds comprised of six 100 millisecond gaps and seven 100 millisecond digits. Of course, this calculation is for explanatory purposes only and will vary in actual use.

Figure 3:
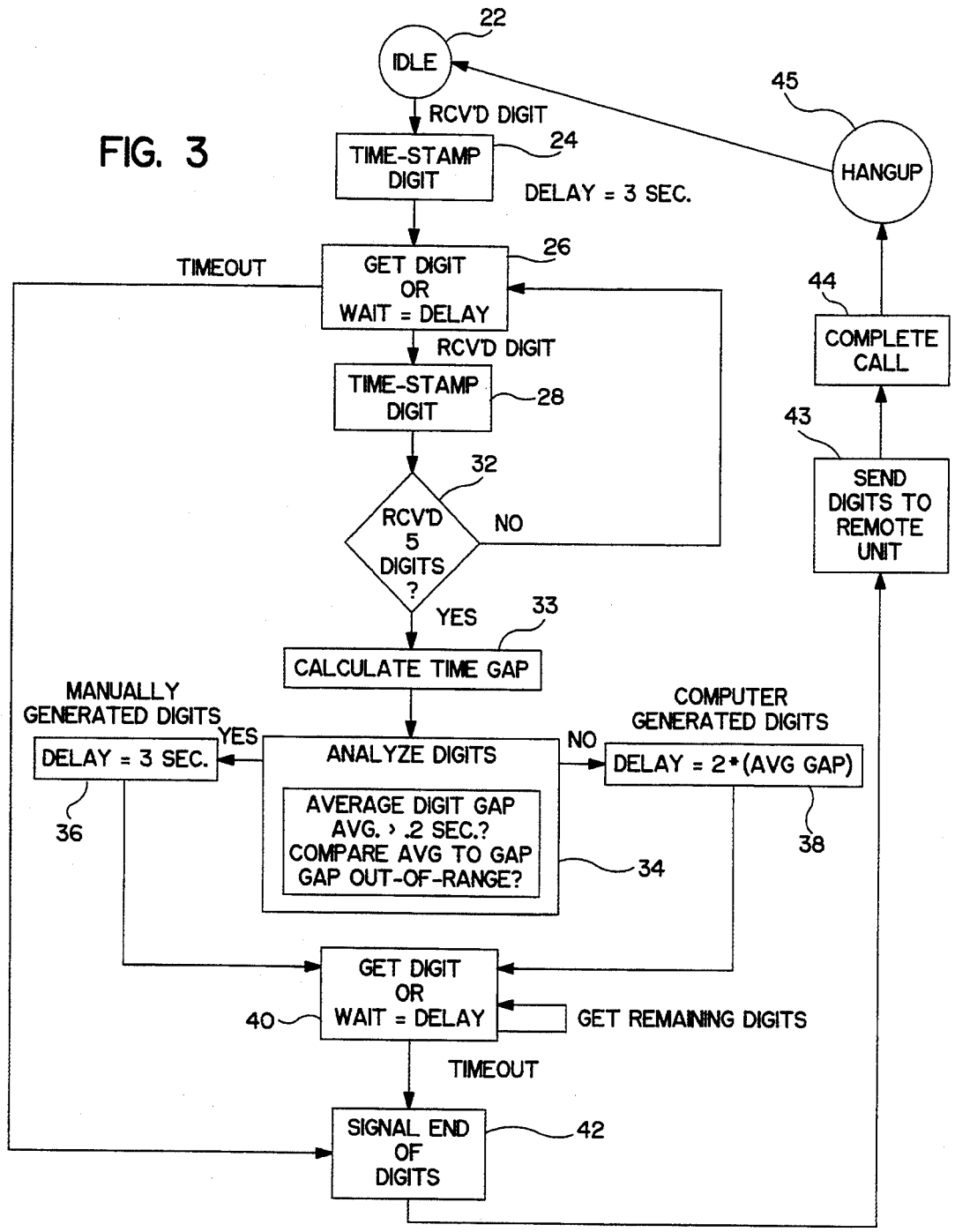
FIG. 3 is a flow diagram illustrating the steps of the present invention.

The processing steps of FIG. 3 will be described in conjunction with the receipt of the seven digit telephone number illustrated in FIG. 2. Upon receipt of the first digit "5", the system switches from idle state (step 22); the received digit is "time stamped" (step 24). After receipt of this first digit, a delay is set; it is indicated as three seconds in FIG. 3, and it is the time during which a next digit must be received. If the next digit is received within the delay (step 26), that second digit will also be time stamped (step 28). Alternatively, if the time delay period expires without receipt of a second digit,

[the single digit is sent as indicated ("timeout") by line 30.] a timeout is generated, an end of digits signal is generated, and the single digit is sent to the remote unit 18 along the communication line 20.

In step 32, the system next determines whether five digits have been received; if so, the system proceeds to step 34 for analysis of the digits or, more accurately, analysis of the gaps between digits. On the other hand, if five digits have not yet been received, the system returns to step 26 to wait for the next incoming digit. After five digits have been received, the measured time gaps between digits are analyzed.

In the preferred embodiment described herein, the system waits for at least five dialed digits in order to avoid the problem where an exceedingly fast manual dialer can replicate the speed of computer generated digits for perhaps two or three digits. For instance, many people can rapidly dial an often-used area code; if the system only measured these three digits it could result in an erroneous designation of the number being labeled computer generated. However, it will be noted that the system can be modified by waiting for a different number of digits.

The time gap between each of the five digits is calculated in step 33 from the time stamp information obtained in step 28. In step 34, the system compares the actual gaps between the five digits to a known or standard average digit gap, and determines whether the differences fall within a preset range. For instance, if the average digit gap is approximately 100 milliseconds and the preset range is approximately 20 milliseconds, the system determines that the digits are computer generated only if the actual time gaps between digits are less than 120 milliseconds (100 millisecond average gap plus 20 millisecond preset time range). If a gap is outside of the range which has been set, the system assumes that the digits of the dialed telephone number are being manually generated and thereafter will wait three seconds with no digit received before concluding that dialing has been completed (step 36). Alternatively, if each comparison between the average digit gap and an actual gap is within the preset range, the system concludes that the digits of the telephone number are being computer generated and will wait a time period much less than three seconds, as set in step 38, before determining that the absence of any more digits is indicative of the completion of dialing. In a preferred embodiment, this time delay will be set to two times the average gap, i.e., in our example, approximately 200 milliseconds. In general, the waiting period, or delay, used in the subsequent processing is representative of the expected time spacing between successive digits for the type of dialing which has just been determined.

The analysis of step 34 can actually take more than one form. For instance, each actual gap can be compared to the known average time gap, and only if each falls within the preset range will the digits be considered computer generated. Alternatively, the average of the actual time gaps can be compared to the known average time gap to determine if the average difference falls within a preset range. It is also possible to compare the actual gaps with each other (without use of a "known" average); if the deviations are not excessive, i.e., they are within computer-generated-digit tolerances, then it can be determined that computer dialing is in progress.

In step 40, the system receives the remaining digits, waiting after each for the delay period which was set previously (i.e., approximately three seconds for manually generated digits or approximately 200 milliseconds for computer generated digits), and signaling the end of dialing after the expiration of the delay period (step 42). Once the end of dialing is signaled, the digits are sent to the remote unit 18 via communication line 20 (step 43) and the call is completed (step 44). Upon completion of the call or if a successful connection is not made, the system hangs up (step 45) and returns to the idle state (step 22).

While the embodiment described above require the comparison of the actual digit gaps to a stored known digit gap, the invention can be implemented in other ways, taking advantage of the fact that computer-generated digits are generally uniformly spaced. For instance, a software system can be comprised wherein if each of five successive digits are all received within a nearly identical time differential, the system will assume that the number is computer generated. Thus, even if a computer generated number is slower than the 100 millisecond average but still produces digits equally spaced (for example, with 200 millisecond spacing) the system will still identify the number as computer generated since humans will rarely, if ever, duplicate equally digits at the time sensitivity (i.e., milliseconds) being measured.

From the foregoing description, it will be apparent that the present invention provides a method and system of efficiently recognizing a last digit of a telephone number dialed from a standard DTMF telephone which greatly reduces the recognition of a last dialed digit. Moreover, it will be further apparent that the invention provides a system for last digit detection which can easily be implemented by microprocessor means.

Various modifications of the invention will occur to those skilled in the art. For example, the average time gap and preset time range values may change as basic telephone system improvements are implemented or for particular uses. Furthermore, it is envisioned that the technique of the present invention will allow easy implemented modification simply by varying certain preprogrammed values.

While there have been shown and described what is presently considered to be the preferred embodiment of this invention, it will be obvious to those skilled in the art that various other changes and modifications may be made without departing from the broader aspects of this invention. It is, therefore, aimed in the appended claims to cover all such changes and modifications as fall within the true spirit and scope of this invention.

I claim:

1. A method of efficiently recognizing when the last digit of a DTMF telephone number has been dialed comprising the steps of:
   (a) monitoring a series of early successive dialed digits;
   (b) calculating the time gaps between said early successive dialed digits;
   (c) comparing the time gaps calculated in step (b) with a predetermined digit time gap applicable to computer generated DTMF dialing to determine whether each calculated time gap and said predetermined digit time gap are within a preset time range;
   (d) determining that said telephone number is (i) computer generated when each calculated time gap is less than the sum of said predetermined digit time gap and said preset time range, and (ii) manually generated when one of said calculated time gaps is greater than or equal to the sum of said predetermined digit time gap and said preset time range;

(e) setting a time delay equal to (i) a first value when said telephone number is determined to be manually generated, and (ii) a second value, less than said first value, when said telephone number is determined to be computer generated;

(f) monitoring digits dialed subsequent to said early dialed digits; and (g) signaling the end of said telephone number dialing when said set time delay expires without receipt of a digit dialed subsequent to said early dialed digits.

2. The method of claim 1 wherein said series of early successive dialed digits is equal to five such digits.

3. The method of claim 1 wherein said predetermined digit time gap is approximately 100 milliseconds.

4. The method of claim 3 wherein said preset time range is approximately 20 milliseconds.

5. The method of claim 1 wherein the first value of said time delay is approximately three seconds.

6. The method of claim 5 wherein the second value of said time delay is approximately 200 milliseconds.

7. A method of signaling an end of a dialed telephone number comprising the steps of:

(a) calculating actual time gaps between early successive received digits of said dialed telephone number;

(b) comparing said actual time gaps to a standard time gap applicable to computer generated digits;

(c) determining whether said dialed telephone number is being manually or computer generated in accordance with the results of said comparing step;

(d) setting a time delay representative of the expected time spacing between successive digits for the type of dialing determined to be in progress in step (c); and (e) signaling receipt of the last dialed digit in said telephone number when said set time delay expires without receipt of a dialed digit.

8. The method of claim 7 wherein in step (c) it is determined that said telephone number is being manually generated when one of said actual time gaps exceeds said standard time gap by an amount greater than or equal to a preset time range.

9. The method of claim 7 wherein said determining step is performed based on a predetermined number of calculated actual time gaps between successive received digits.

10. The method of claim 7 wherein in step (b) each of said actual time gaps is compared to said standard time gap.

11. The method of claim 10 wherein in step (c) said telephone number is determined to be computer generated when each of said actual time gaps is less than the sum of said standard time gap and a preset time range.

12. The method of claim 7 wherein in step (c) said telephone number is determined to be computer generated when the average of a number of actual time gaps is less than the sum of said standard time gap and a preset time range.

13. A method of efficiently recognizing a last digit of a standard DTMF dialed telephone number comprising the steps of:

timing relative to each other a selected number of successive received digits of said telephone number;

comparing the timing of said successive received digits with digit spacing patterns applicable to computer generated digits to determine whether the telephone number is being dialed manually or automatically; and determining when said last digit has been dialed when a succeeding digit is not received within a predetermined time interval, said predetermined time interval being a function of whether it has been determined that the telephone number is being dialed manually or automatically.

* * * * *